United States Patent
Yoshida et al.

(10) Patent No.: US 8,018,103 B2
(45) Date of Patent: Sep. 13, 2011

(54) DRIVING MECHANISM

(75) Inventors: Tadafumi Yoshida, Toyota (JP); Masaki Yoshino, Toyota (JP); Yutaka Hotta, Chiryu (JP)

(73) Assignees: Toyota Jidosha Kabushiki Kaisha, Aichi-ken (JP); Aisin Aw Co., Ltd., Aichi-ken (JP)

( * ) Notice: Subject to any disclaimer, the term of this patent is extended or adjusted under 35 U.S.C. 154(b) by 133 days.

(21) Appl. No.: 12/598,857

(22) PCT Filed: May 23, 2008

(86) PCT No.: PCT/JP2008/059966
§ 371 (c)(1),
(2), (4) Date: Nov. 4, 2009

(87) PCT Pub. No.: WO2008/146902
PCT Pub. Date: Dec. 4, 2008

(65) Prior Publication Data
US 2010/0127583 A1 May 27, 2010

(30) Foreign Application Priority Data

May 25, 2007 (JP) .................................. 2007-139502

(51) Int. Cl.
*H02K 9/00* (2006.01)
(52) U.S. Cl. ........................................................ 310/58
(58) Field of Classification Search .................... 310/52, 310/54, 58, 64, 75 R; 903/906, 951–952
See application file for complete search history.

(56) References Cited

U.S. PATENT DOCUMENTS

| 4,284,913 A * | 8/1981 | Barnhardt ........................ 310/54 |
| 6,166,937 A | 12/2000 | Yamamura et al. |
| 6,323,613 B1 | 11/2001 | Hara et al. |
| 6,833,641 B2 * | 12/2004 | Uchida et al. ................... 310/54 |
| 7,211,912 B2 * | 5/2007 | Takenaka et al. ................ 310/54 |
| 7,481,924 B2 * | 1/2009 | Takahashi et al. ............. 210/222 |

FOREIGN PATENT DOCUMENTS

| JP | 07-288950 A | 10/1995 |
| JP | 11-346480 A | 12/1999 |
| JP | 2001-238405 A | 8/2001 |
| JP | 2001-238406 A | 8/2001 |
| JP | 2003-324903 A | 11/2003 |
| JP | 2003-339102 A | 11/2003 |
| JP | 2006-197781 A | 7/2006 |
| JP | 2007-099121 A | 4/2007 |

* cited by examiner

*Primary Examiner* — Tran N Nguyen
(74) *Attorney, Agent, or Firm* — Sughrue Mion, PLLC

(57) ABSTRACT

A driving apparatus includes: a rotating electrical machine; an inverter capable of supplying electric power to the rotating electrical machine; an electrical device connected to the inverter; a containing case capable of containing the rotating electrical machine, the inverter, and the electrical device; and a cooling coolant circulation circuit, distributing cooling coolant capable of cooling the inverter and the electrical device, which allows the inverter to be cooled at an upstream side relative to the electrical device in a direction in which the cooling coolant is distributed.

5 Claims, 4 Drawing Sheets

DRIVING MECHANISM

TECHNICAL FIELD

The present invention relates to a driving mechanism, in particular, to cooling of a driving mechanism containing a rotating electrical machine, an inverter, and a capacitor.

BACKGROUND ART

Conventionally, various types of driving mechanisms have been proposed which allow for cooling of a motor, an inverter, and the like integrally installed therein.

For example, Japanese Patent Laying-open 2003-339102 describes a vehicular driving apparatus including first and second motor generators, first and second switching circuits, and a coolant path in which coolant is distributed to be sprayed directly to each of the first and second motor generators and to cool the first and second switching circuits.

Further, Japanese Patent Laying-open 2001-238405 describes a driving apparatus including a driving apparatus case, a motor contained in this driving case, and an inverter attached to the driving apparatus case. Between the driving apparatus case and the inverter, a cooling flow path is provided to cool the inverter.

Japanese Patent Laying-open 7-288950 describes a driving motor including a driving system and a cooling system. In the driving motor, downsizing and weight reduction of the entire configuration is achieved.

Japanese Patent Laying-open 2003-324903 describes a vehicular inverter integrated motor in which shock resistance is secured. Japanese Patent Laying-open 2006-197781 describes an inverter integrated motor unit that facilitates installation and improves a cooling capability.

None of the conventional driving apparatuses and the like proposes a structure for cooling a rotating electrical machine, an inverter, and electrical devices such as a capacitor connected to the inverter, all together. On the other hand, it is known that a capacitor or a reactor cannot attain its desired performance when reaching or exceeding a predetermined temperature.

DISCLOSURE OF THE INVENTION

The present invention is made in light of the foregoing problems, and its object is to provide a driving mechanism allowing for cooling of a rotating electrical machine such as a motor, an inverter, and an electrical device connected to the inverter.

A driving mechanism according to the present invention includes: a rotating electrical machine; an inverter capable of supplying electric power to the rotating electrical machine; an electrical device connected to the inverter; and a containing case capable of containing the rotating electrical machine, the inverter, and the electrical device. The driving mechanism further includes a cooling coolant circulation circuit, distributing cooling coolant capable of cooling the inverter and the electrical device, which allows the inverter to be cooled at an upstream side relative to the electrical device in a direction in which the cooling coolant is distributed.

It is preferable that the inverter and the electrical device be arranged along a perimeter of the rotating electrical machine. It is preferable that the electrical device include at least one of a capacitor and a reactor.

It is preferable that the cooling coolant circulation circuit be provided between the inverter and the rotating electrical machine as well as between the electrical device and the rotating electrical machine.

Preferably, the driving mechanism further includes: a rotating electrical machine coolant circulation circuit distributing rotating electrical machine coolant for cooling the rotating electrical machine; and a heat exchange portion capable of exchanging heat between the cooling coolant and the rotating electrical machine coolant.

It is preferable that the rotating electrical machine include a first rotating electrical machine and a second rotating electrical machine, and the rotating electrical machine coolant circulation circuit includes a first reservoir storing first rotating electrical machine coolant for cooling the first rotating electrical machine, and a second reservoir storing second rotating electrical machine coolant for cooling the second rotating electrical machine. Further, the cooling coolant circulation circuit passes by a perimeter of the first reservoir at an upstream side relative to the second reservoir in the direction in which the cooling coolant is distributed, so as to enable heat exchange between the first rotating electrical machine coolant and the cooling coolant.

Preferably, the cooling coolant circulation circuit includes: an inverter heat dissipating unit capable of dissipating heat from the inverter to the cooling coolant, and a capacitor heat dissipating unit capable of dissipating heat from the capacitor to the cooling coolant.

Note that it is expected at the moment of filing of the present application to appropriately combine the above-described configurations as needed.

In accordance with a driving mechanism according to the present invention, each of a rotating electrical machine, an inverter, and an electrical device connected to the inverter can be cooled well.

BEST MODES FOR CARRYING OUT THE INVENTION

Figure 1:
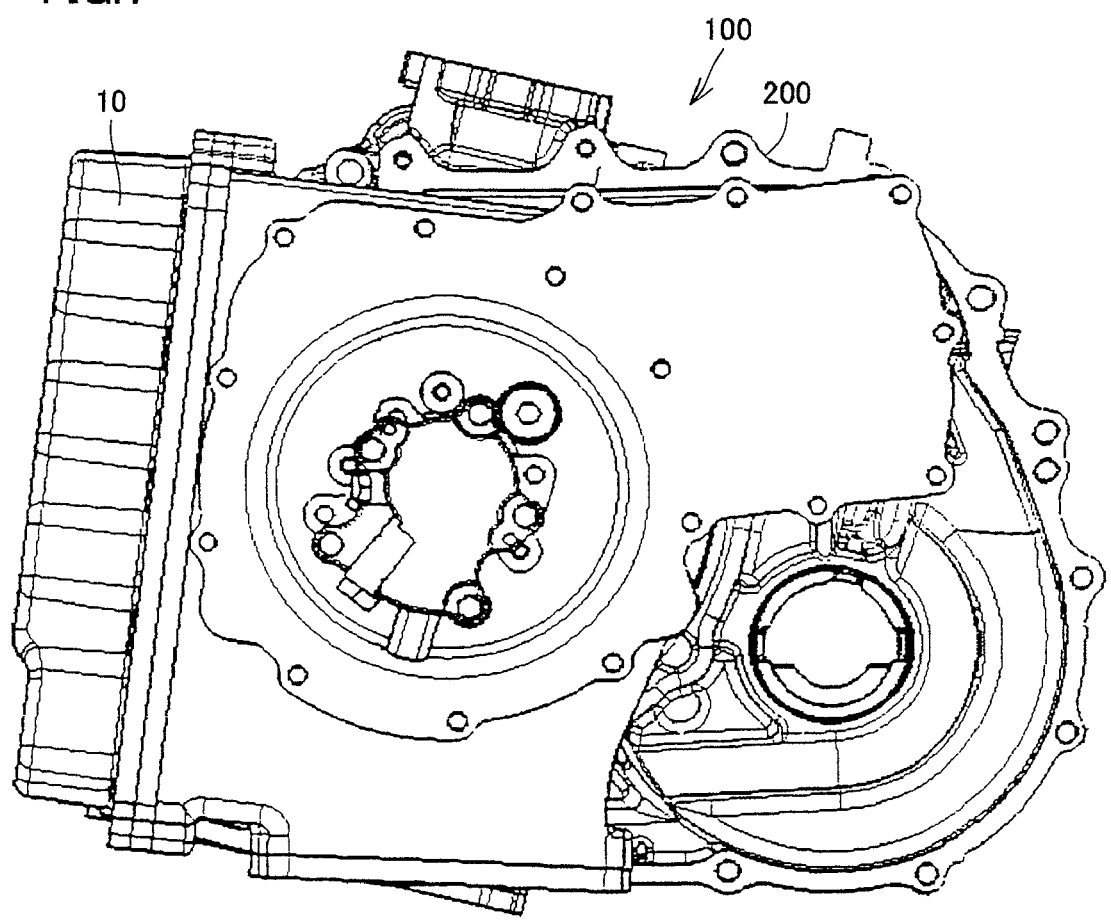
FIG. 1 is a side view of a driving apparatus according to the present embodiment.

A driving apparatus (driving mechanism) 100 according to the present embodiment will be described with reference to FIG. 1 to FIG. 4. Note that the same or equivalent configurations are given the same reference characters, and explanation therefor may not be repeated.

Figure 2:
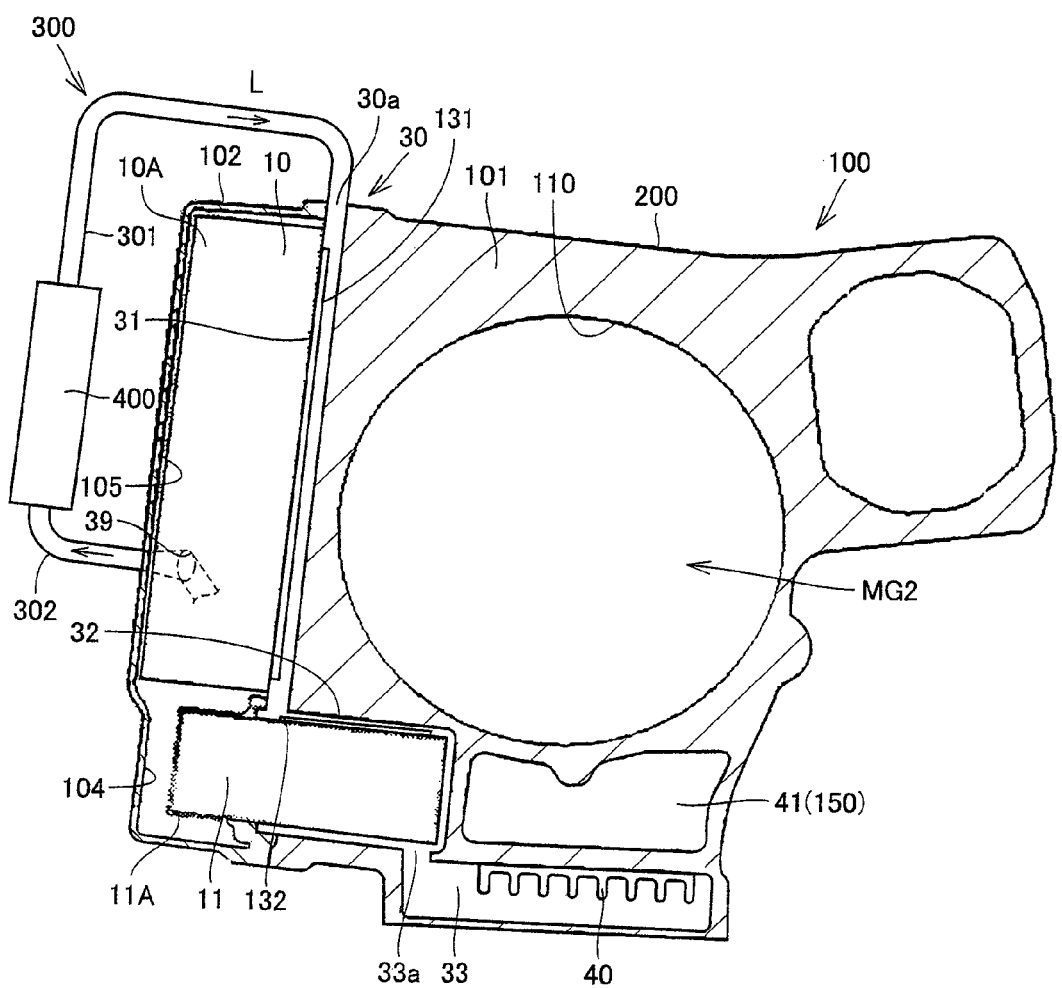
FIG. 2 is a cross sectional view of the driving apparatus shown in FIG. 1.
Figure 3:
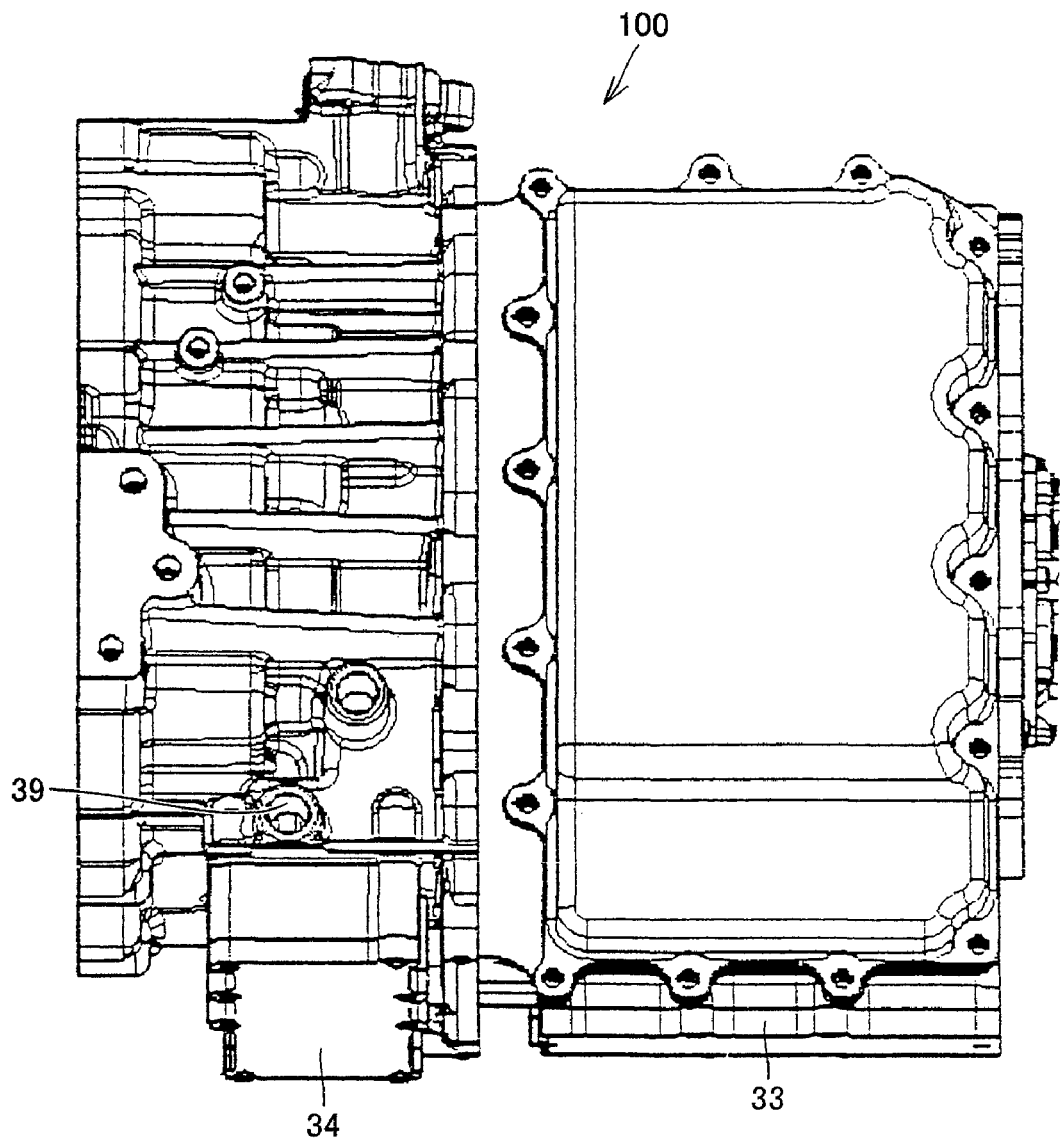
FIG. 3 is a front view of the driving apparatus.
Figure 4:
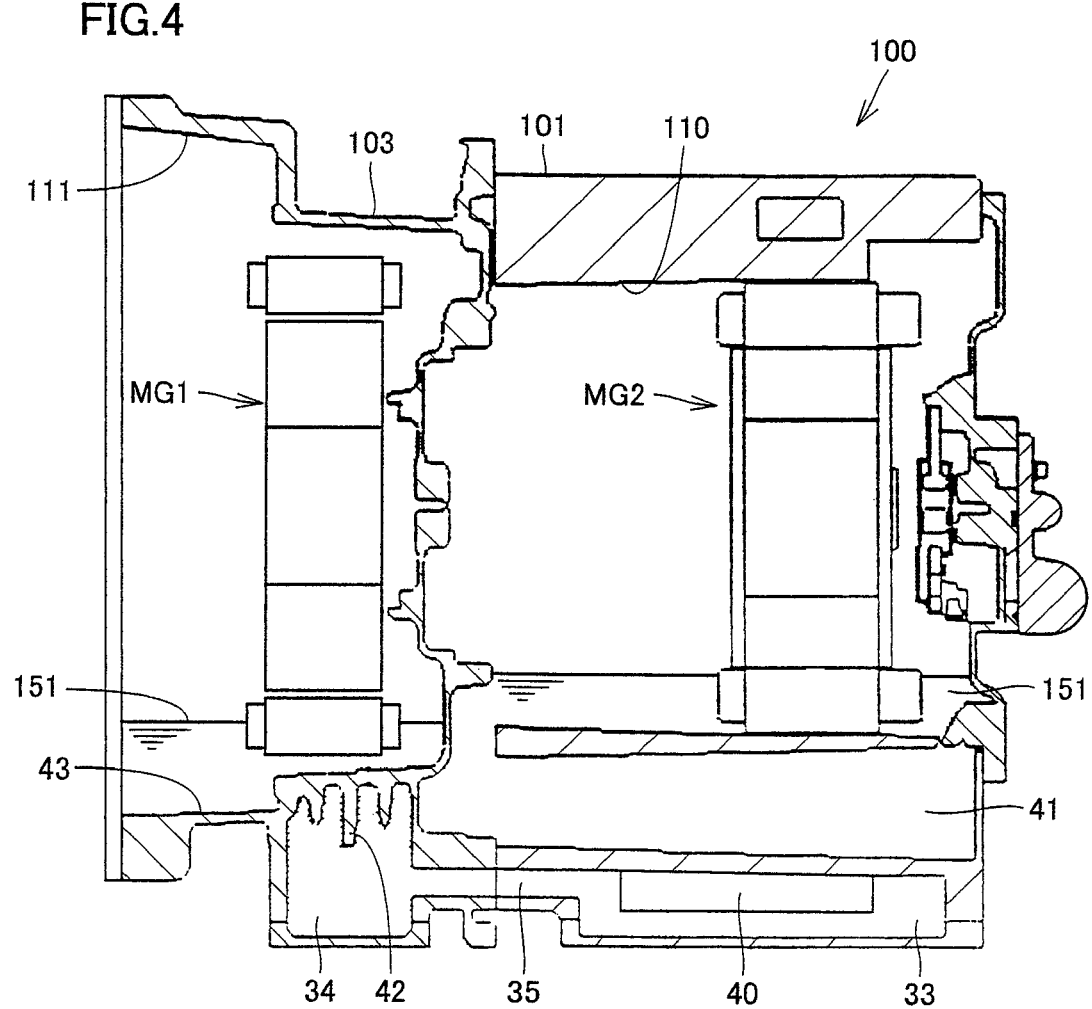
FIG. 4 is a side cross sectional view of the driving apparatus.

FIG. 1 is a side view of a driving apparatus 100 according to the present embodiment. FIG. 2 is a cross sectional view of driving apparatus 100 shown in FIG. 1. FIG. 3 is a front view of driving apparatus 100. FIG. 4 is a side cross sectional view of driving apparatus 100.

Here, as shown in FIG. 2 and FIG. 4, driving apparatus 100 includes a motor generator MG2 capable of generating motive power to drive a wheel of a vehicle, a motor generator MG1 capable of generating electric power when being driven by motive power given from an internal combustion engine not shown in the figures, an inverter 10, and a capacitor 11.

Inverter 10 includes a plurality of IGBTs (Insulated Gate Bipolar Transistors), and a control board having an electronic component mounted thereon to control turning on/off (conduction/interruption) of the gate of each of the IGBTs (neither of them is shown in the figures). In response to a signal from a control apparatus not shown in the figures, inverter 10 is driven to convert direct current power, supplied from a battery (not shown), into alternating current power and supplies it to motor generator MG2. When motor generators MG1, MG2 perform a regenerative operation, inverter 10 converts alternating current power generated by motor generators MG1, MG2 into direct current power in order to charge the battery.

Capacitor 11 is connected to the battery (not shown) and inverter 10, smoothes electric power from the battery and supplies it to inverter 10, and smoothes electric power and supplies it to the battery. This restrains occurrence of inrush current to inverter 10.

As shown in FIG. 1 and FIG. 4, a containing case 200 includes a first containing case 101 containing motor generator MG2, a second containing case 103 containing motor generator MG1, and an electronics containing case 102 containing inverter 10 and capacitor 11 connected to inverter 10. It should be noted that, in the present embodiment, containing case 200 contains motor generators MG1, MG2, inverter 10, and capacitor 11, but the present invention is not limited to this. For example, instead of capacitor 11, a reactor connected to inverter 10 may be contained therein, or both capacitor 11 and the reactor may be contained. In addition, a converter may be contained.

Motor generators MG1, MG2 have their rotating shafts positioned coaxially. Along the extensions of the rotating shafts, first containing case 101 and second containing case 103 are arranged.

Here, first containing case 101 defines a rotating electrical machine containing portion 110 capable of containing motor generator MG2; a coolant reservoir 41; and a jacket portion 33.

Electronics containing case 102 is attached to a side surface of first containing case 101. Electronics containing case 102 thus attached to the side surface of first containing case 101 defines therein an inverter receiving portion (inverter containing portion) 105 that receives inverter 10, and a capacitor receiving portion (capacitor receiving portion) 104 capable of receiving capacitor 11.

Inverter 10 is contained in an inverter case 10A. Inverter case 10A is contained in inverter receiving portion 105. Note that if the converter is also contained in containing case 200, it is preferable to contain the converter in inverter receiving portion 105.

Capacitor 11 is contained in a capacitor case 11A. Capacitor case 11A is contained in capacitor receiving portion 104.

Here, each of inverter case 10A and capacitor case 11A is provided around first containing case 101. Specifically, inverter case 10A is positioned lateral to rotating electrical machine containing portion 110 of first containing case 101, whereas capacitor case 11A is positioned obliquely downward relative to rotating electrical machine containing portion 110.

Accordingly, inverter 10 is positioned above capacitor 11 and lateral to rotating electrical machine containing portion 110, and inverter 10 and capacitor 11 are arranged around motor generator MG2 along the inner circumferential surface of first containing case 101 that defines rotating electrical machine containing portion 110.

Thus, inverter 10 and capacitor 11 are not overlap with each other in the surroundings of motor generator MG2. Hence, the width of the case can be prevented from being large. Accordingly, the size of containing case 200 can be compact.

As shown in FIG. 4, second containing case 103 defines a rotating electrical machine containing portion 111 containing motor generator MG1; and a jacket portion 34. At the bottom surface of rotating electrical machine containing portion 111, a coolant reservoir 43, which stores lubricating oil 151 for cooling motor generator MG1, is defined.

Driving apparatus 100 further includes a coolant circulation circuit (rotating electrical machine coolant circulation circuit) 150 for cooling motor generator MG1 and motor generator MG2.

In coolant circulation circuit 150, insulative lubricating oil 151 is distributed. Lubricating oil 151 is sprayed to motor generators MG1, MG2 to cool them and is supplied to bearings of the rotating shafts of motor generators MG1, MG2 to secure lubricity of the bearings.

Lubricating oil 151 sprayed to motor generator MG2 and supplied to the bearing of motor generator MG2 is then accumulated in coolant reservoir 41 formed within second containing case 103. On the other hand, lubricating oil 151 sprayed to motor generator MG1 and supplied to the bearing of motor generator MG1 is then accumulated in the bottom portion of first containing case 103. Thus, lubricating oil 151 supplied to motor generators MG1, MG2 is brought back to an oil pan (not shown), is then sucked up by an oil pump or the like, is supplied to motor generators MG1, MG2, and the like through a strainer, and goes back to the oil pan again.

Driving apparatus 100 is provided with a coolant circulation circuit 300 including a coolant distribution pipe 30 provided in containing case 200 and a radiator 400 that cools coolant (LLC (Long Life Coolant)) L, such as water, flowing in coolant distribution pipe 30 by means of heat exchange between coolant L and external air.

Coolant distribution pipe 30 includes a pipe path 31 extending between the side surface of first containing case 101 lateral to rotating electrical machine containing portion 110 and the side surface of inverter case 10A. Accordingly, coolant L flowing in pipe path 31 can absorb heat from inverter 10 to cool it.

In addition, coolant distribution pipe 30 thus provided between motor generator MG2 and inverter 10 can prevent transfer of heat generated by driving of motor generator MG2 to inverter 10.

Here, pipe path 31 has a portion in contact with or adjacent to the side surface of inverter case 10A. In this portion, a plurality of fins (inverter heat dissipating units) 131, each extending in the direction in which pipe path 31 extends, are provided. Accordingly, a larger contact area with coolant L is obtained therein, allowing heat to be dissipated well from inverter 10 to coolant L via fins 131.

Connected to pipe path 31 is a pipe path 301 connected to radiator 400. Coolant L cooled by radiator 400 is supplied thereto via an opening 30a located at the upper end of pipe path 31. Hence, coolant L not heated by other devices such as capacitor 11 can be supplied for inverter 10 and cool it well.

In addition, since pipe path 31 extends from the upper surface side to the lower surface side of containing case 200, gas having entered pipe path 31, such as air or water vapor, will be moved toward the upper end of pipe path 31.

This can prevent accumulation of air in pipe path 31 at a portion opposite to inverter 10, thereby cooling inverter 10 well.

It is preferable that the width of pipe path 31 (the width in the direction in which the rotating shaft of motor generator MG2 extends) and the width of inverter 10 match with each other. Pipe path 31 thus formed can prevent transfer of heat from motor generator MG2 to inverter 10 and achieve improved efficiency for cooling inverter 10.

Coolant distribution pipe 30 includes a pipe path 32 that is connected to the lower end of pipe path 31 extending from the upper side to the lower side of containing case 200 and that is provided around capacitor 11.

Pipe path 32 extends from the upper surface of capacitor case 11A to the bottom surface of capacitor case 11A via the side surface thereof opposite to first containing case 101.

In this way, pipe path 32 extends to surround the circumference of capacitor case 11A, whereby capacitor 11 can be cooled well.

Further, because pipe path 32 is provided between motor generator MG2 and capacitor 11, heat from motor generator MG2 can be prevented from being transferred to capacitor 11.

Furthermore, pipe path 32 is inclined downward at its portion over the upper surface of capacitor 11, more specifically, is inclined downward from its portion connected to pipe path 31 to its downstream side in the direction in which coolant L is distributed. Also, pipe path 32 extends generally vertically at its portion located at the side surface of capacitor 11. Accordingly, gas having entered in pipe path 32, such as air or water vapor, is let out to pipe path 31.

In this way, the gas is prevented from remaining in pipe path 32 and pipe path 32 can be therefore filled with coolant L. Hence, capacitor 11 can be cooled well.

Here, capacitor 11 is positioned lateral to coolant reservoir 41 storing the lubricating oil. Pipe path 32 also has a portion located between capacitor 11 and coolant reservoir 41. Hence, heat from coolant reservoir 41 can be prevented from being transferred to capacitor 11.

Note that a plurality of fins (capacitor heat dissipating units) 132 each extending in the direction in which pipe path 32 extends may be provided on the inner surface of pipe path 32 at a portion adjacent to capacitor case 11A in order to achieve improved cooling efficiency.

Further, the width direction of pipe path 32 (direction perpendicular to the plane of FIG. 2; direction in which the rotating shaft of motor generator MG2 extends) and the width of capacitor 11 may match with each other. Pipe path 32 thus formed can more efficiently prevent heat transfer from motor generator MG2 and coolant reservoir 41 to capacitor 11, thereby cooling capacitor 11 more efficiently.

Furthermore, coolant distribution pipe 30 includes jacket portion 33 connected to pipe path 32. Jacket portion 33, provided below coolant reservoir 41, extends in the axial direction of the rotating shaft of motor generator MG2 as shown in FIG. 2. At jacket portion 33, heat is exchanged between coolant L therein and lubricating oil 151 in coolant reservoir 41. Thus, lubricating oil 151 can be cooled.

In particular, a plurality of fins (lubricating oil heat dissipating units) 40 each extending in the direction in which jacket portion 33 extends are provided on the inner surface of jacket portion 33 at a portion opposite to coolant reservoir 41. Hence, lubricating oil 151 can be cooled well.

Here, as shown in FIG. 2 and FIG. 4, coolant reservoir 41, provided below motor generator MG2, extends in the axial direction of the rotating shaft of motor generator MG2, and therefore extends in the same direction as the direction in which jacket portion 33 extends.

Hence, jacket portion 33 and coolant reservoir 41 face each other at a large area, thus securing an area allowing for heat exchange between lubricating oil 151 and coolant L. Lubricating oil 151 can be therefore cooled well.

Further, coolant distribution pipe 30 includes jacket portion 34 that is provided in the downstream side relative to jacket portion 33 in the direction in which the coolant is distributed and that is connected to jacket portion 33.

Jacket portion 34 is provided below rotating electrical machine containing portion 111 containing motor generator MG1, and coolant reservoir 43. Rotating electrical machine containing portion 111 has a generally cylindrical shape. Jacket portion 34 extends along the inner circumferential surface of second containing case 103 that defines rotating electrical machine containing portion 111.

At the bottom surfaces of rotating electrical machine containing portion 111 and coolant reservoir 43, the lubricating oil sprayed to motor generator MG1 and supplied to the bearing of motor generator MG1 is accumulated. Since jacket portion 34 is provided adjacent to the bottom surfaces of rotating electrical machine containing portion 111 and coolant reservoir 43, the lubricating oil in rotating electrical machine containing portion 111 and coolant reservoir 43 can be cooled.

Further, a fin 42 extending in the direction in which jacket portion 34 extends is provided on the inner surface of jacket portion 34 at a portion adjacent to rotating electrical machine containing portion 111. Accordingly, the lubricating oil can be cooled well.

Coolant L is brought back from an outlet 39 shown in FIG. 3 into radiator 400 via pipe path 302. Then, coolant L is discharged again by a pump (not shown) or the like into pipe path 31 and is distributed in coolant distribution pipe 30.

As described above, in driving apparatus 100 according to the present embodiment, inverter 10, which has a heat-resistant temperature lower than that of capacitor 11, is first cooled, and capacitor 11 is cooled thereafter. This can restrain deterioration of inverter 10.

Further, capacitor 11 is cooled before cooling of lubricating oil 151. This prevents temperature rising of coolant L for cooling capacitor 11, whereby capacitor 11 can be cooled well too.

Furthermore, coolant circulation circuit 150 for cooling motor generators MG1, MG2, and coolant circulation circuit 300 for cooling inverter 10 and capacitor 11 are provided separately. Hence, for example, even if supply of lubricating oil to motor generators MG1, MG2 being driven causes pulsing in the lubricating oil, this impact can be prevented from being transferred to inverter 10 and capacitor 11. Note that in the present embodiment, inverter 10 and the like are provided lateral to the side surface of motor generator MG2 capable of generating motive power for driving a wheel of a hybrid vehicle or the like, but the present invention is not limited to this. Inverter 10 and the like may be provided lateral to the side surface of motor generator MG1 functioning as an electric power generator. Where inverter 10 and the like are provided lateral to the side surface of motor generator MG1 as such, coolant L first flows to cool inverter 10 and the like, then lubricating oil 151 in coolant reservoir 43, and then lubricating oil 151 in coolant reservoir 41.

Although the embodiment of the present invention has been described, the embodiment disclosed herein is illustrative and non-restrictive in any respect. The scope of the present invention is defined by the scope of claims rather than the above description, and is intended to include any modifications within the scope and meaning equivalent to the terms of the claims.

INDUSTRIAL APPLICABILITY

The present invention relates to a driving mechanism, in particular, is suitable for cooling of a driving mechanism containing a rotating electrical machine, an inverter, and a capacitor.

The invention claimed is:
1. A driving mechanism comprising:
a rotating electrical machine;
an inverter capable of supplying electric power to said rotating electrical machine;
an electrical device connected to said inverter;

a containing case capable of containing said rotating electrical machine, said inverter, and said electrical device; and a cooling coolant circulation circuit, distributing cooling coolant capable of cooling said inverter and said electrical device, which allows said inverter to be cooled at an upstream side relative to said electrical device in a direction in which said cooling coolant is distributed;

a rotating electrical machine coolant circulation circuit distributing rotating electrical machine coolant for cooling said rotating electrical machine; and a heat exchange portion capable of exchanging heat between said cooling coolant and said rotating electrical machine coolant, said rotating electrical machine including a first rotating electrical machine and a second rotating electrical machine, said rotating electrical machine coolant circulation circuit including a first reservoir storing first rotating electrical machine coolant for cooling said first rotating electrical machine, and a second reservoir storing second rotating electrical machine coolant for cooling said second rotating electrical machine, and said cooling coolant circulation circuit passing by a perimeter of said first reservoir at an upstream side relative to said second reservoir in the direction in which said cooling coolant is distributed, so as to enable heat exchange between said first rotating electrical machine coolant and said cooling coolant.

2. The driving mechanism according to claim 1, wherein said inverter and said electrical device are arranged along a perimeter of said rotating electrical machine.

3. The driving mechanism according to claim 1, wherein said electrical device includes at least one of a capacitor and a reactor.

4. The driving mechanism according to claim 1, wherein said cooling coolant circulation circuit is provided between said inverter and said rotating electrical machine as well as between said electrical device and said rotating electrical machine.

5. The driving mechanism according to claim 3, wherein said cooling coolant circulation circuit includes:

an inverter heat dissipating unit capable of dissipating heat from said inverter to said cooling coolant, and a capacitor heat dissipating unit capable of dissipating heat from said capacitor to said cooling coolant.

* * * * *